Figure 1:
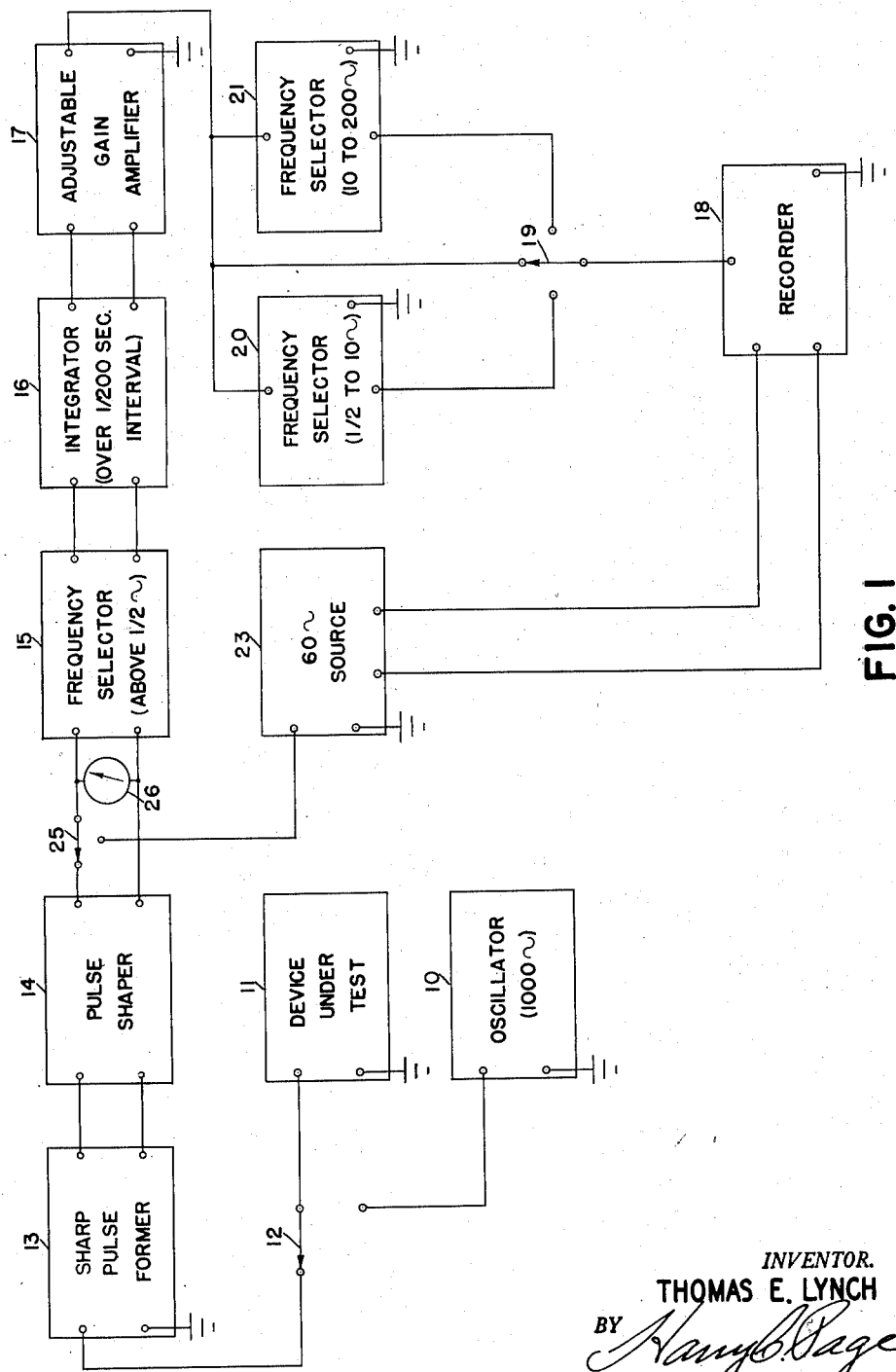

INVENTOR.
THOMAS E. LYNCH
BY
ATTORNEY

Patented Aug. 28, 1951

2,566,222

UNITED STATES PATENT OFFICE 2,566,222

FREQUENCY CHANGE INDICATOR

Thomas E. Lynch, Cleveland, Ohio, assignor to The Brush Development Company, Cleveland, Ohio, a corporation of Ohio Application October 11, 1947, Serial No. 779,369

8 Claims. (Cl. 175—368)

The present invention relates to an apparatus for providing an indication of frequency changes of a wave signal. While the invention is of general application, it is of particular utility in providing indications of frequency changes which are due to variations in the speed of a mechanical drive system which is utilized to generate the signal the variations of frequency of which are measured.

There are many uses for an apparatus which will provide an indication of small frequency changes of a wave signal. Thus, in some cases, it has been the practice to utilize a tone wheel to generate an alternating potential, the frequency of which depends upon a mechanical system driving the tone wheel. In some cases, the frequency of the signal generated by the tone wheel has been utilized to provide an indication of the speed of the mechanical system and of variations in this speed due to various undesired deficiencies in the gearing, bearings, shafts, driving motor, etc. Perhaps the most important use, of apparatus for providing indications of frequency changes, of a wave signal of the type under consideration, relates to the checking of the drive mechanism of sound-reproducing systems.

In a sound-recording and reproducing system, if a sound of exactly constant frequency is recorded and thereafter reproduced it is generally found that, even though the average frequency of the reproduced signal corresponds exactly to the frequency of the sound which was originally recorded, variations or imperfections in the gears, bearings, shafts and motor cause certain changes or variations in the frequency of the reproduced signal. Thus, if some defect in the driving apparatus causes the mechanical system to be driven at a slightly higher speed than the correct one, a signal of increased frequency results insofar as the reproduced signal is concerned. Conversely, if the speed of the mechanical system is too slow, there results a reproduced signal having a frequency which is too low. These variations in frequency, for example, may be caused by a gear which is slightly eccentric. Under such circumstances, the frequency of the reproduced signal increases and decreases in synchronism with the rotation of the gear which is defective. Thus, a measurement of the frequency of the reproduced signal, or of frequency changes thereof, provides a good check upon this feature of the mechanical drive system. It is apparent, therefore, that a considerable knowledge of the accuracy of the drive system can be obtained from an analysis of the frequency components in the reproduced output signal.

The rates of frequency variations of the reproduced signal which are here under consideration and which are most troublesome lie within the range of ½ to 200 cycles per second. The low-frequency components in this range of signals are generally called "wow" components by sound engineers; whereas, the high frequency components within this range are generally called "flutter" components. Components of either of these types are very annoying in a reproduced sound signal. While an elaborate recording apparatus may sometimes be utilized to record sound on a record medium, and thus provide a recording which is substantially free from undesirable components of the type here under consideration, it is generally true that the reproducing apparatus is much less elaborate and is likely to be the most frequent cause of trouble. In the manufacture of sound-signal reproducing apparatus, therefore, it is of particular importance to have available an apparatus which provides a ready and easily calibrated indication of deficiencies in the mechanical drive system of the apparatus.

The apparatus which has previously been used for checking mechanical drive systems has generally had the defects of a low sensitivity, critical and frequent calibration requirements, the requirement of a carefully controlled carrier signal, faulty results due to amplitude modulation of a carrier signal used in the system, restricted frequency range, the requirement of elaborate additional equipment, and difficulty due to starting transients in the system. It would be very desirable, therefore, to provide an apparatus of the type under consideration and in which all of these defects are eliminated.

It is, therefore, an object of the invention to provide an apparatus for indicating frequency changes of a wave signal which is not subject to one or more of the above-mentioned defects of prior such apparatus.

It is an object of the invention to provide an improved apparatus for indicating frequency changes of a wave signal.

It is an object of the invention to provide an apparatus for indicating frequency changes of a wave signal and which can be accurately calibrated in the absence of known variations in the frequency of the signal.

It is still another object of the invention to provide an improved apparatus, for indicating frequency changes of a wave signal, which has a substantially linear output characteristic over its entire range of operation.

In accordance with the invention, an apparatus for providing an indication of frequency changes of a first wave signal comprises means for deriving sharp electrical pulses having relative spacings dependent upon the intercepts of this wave signal. The apparatus also includes means dependent upon the sharp pulses for deriving a second wave signal having only separate portions corresponding respectively to each of the sharp pulses and having identical average values in each of these portions. The apparatus also comprises means for deriving a third signal varying in accordance with the average value, over a relatively short time interval, of the frequency components of the above-mentioned second signal which have a period less than a predetermined time substantially greater than the above-mentioned short time interval. There is also provided means for utilizing the above-mentioned third signal to provide indications of changes of frequency of the above-mentioned first wave signal.

For a better understanding of the present invention together with other and further objects thereof, reference is had to the following description taken in connection with the accompanying drawings, and its scope will be pointed out in the appended claims.

Figure 2:
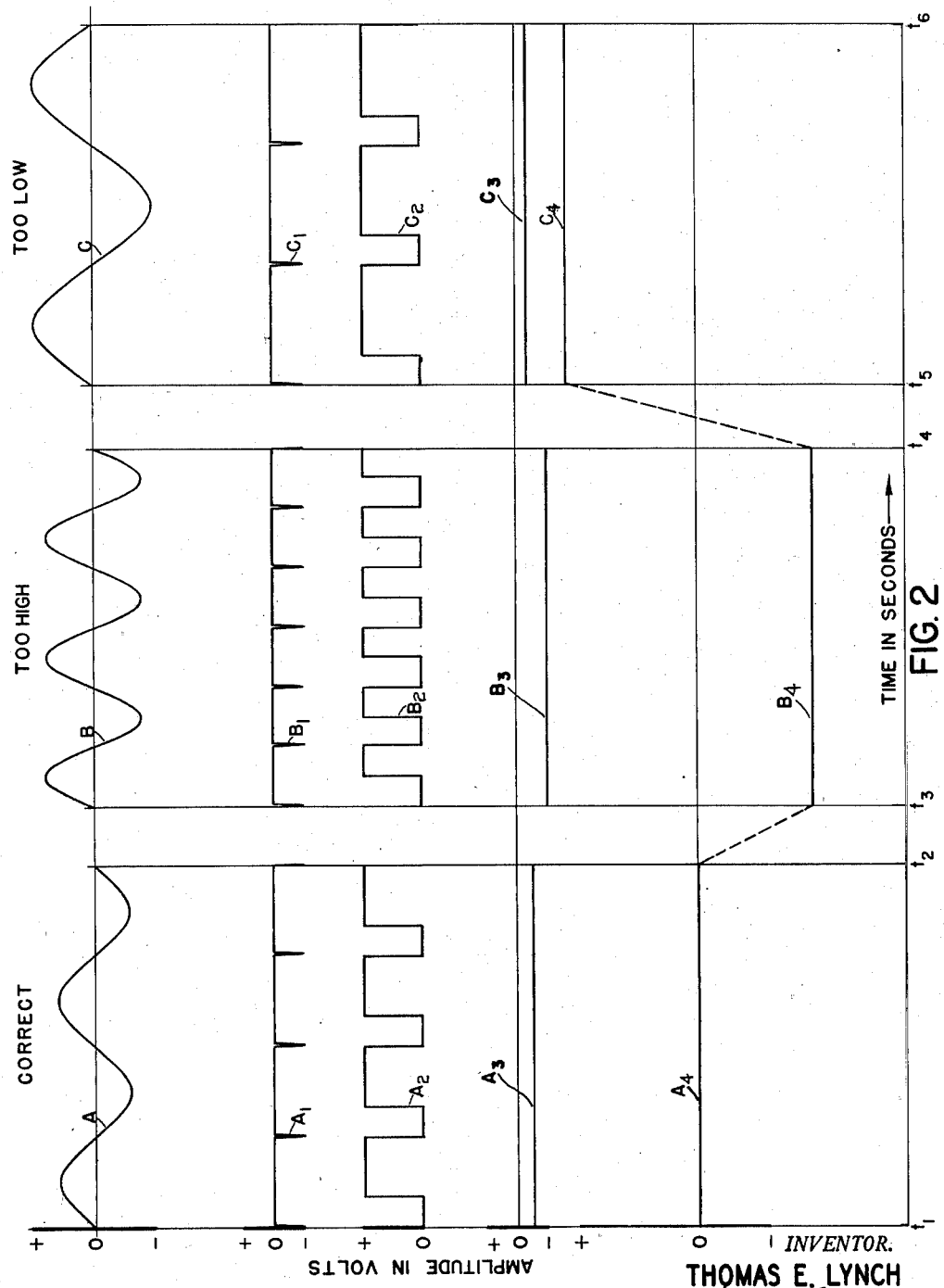
Figure 3:
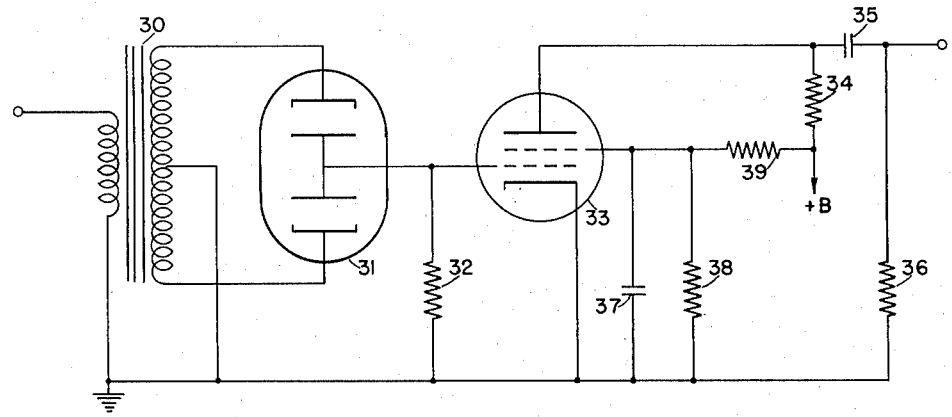

Fig. 1 of the drawings is a block diagram of an apparatus in accordance with the invention for providing indications of frequency changes of a wave signal; Fig. 2 comprises curves utilized to describe operation of the apparatus of Fig. 1; and Figs. 3, 4, and 5, respectively, illustrate certain specific circuits which may be used in the units 13, 14, and 15 of the apparatus of Fig. 1.

Referring now more particularly to Fig. 1, an apparatus is there shown for providing an indication of frequency changes of a first wave signal. These frequency changes may, for example, be frequency changes in the wave signal of an oscillator 10, as recorded and thereafter reproduced by a device under test 11. A two-position switch 12 is provided for connecting device 11 to oscillator 10 so that the signal output of the oscillator is recorded and thereafter for connecting unit 11 to components of the system utilized to provide indications of frequency changes in the reproduced signal.

The reproduced output of device 11 is first coupled into a sharp-pulse forming circuit 13, the purpose of which is to provide sharp electrical pulses having relative spacings depending upon the intercepts of the reproduced wave signal.

A pulse shaper 14 is connected to the output circuit of pulse former 13 to provide means, dependent upon the sharp pulses generated in unit 13, for deriving a second wave signal having only separate portions corresponding respectively to each of the sharp pulses and having identical average values in each of its portions. Specifically, the system is preferably such that a rectangular pulse of pre-determined duration is provided in pulse shaper 14 for each sharp pulse supplied thereto from pulse former 13. Such a signal with rectangular pulses thus has only separate portions, namely, the portions from the beginning of one pulse to the beginning of a second pulse, corresponding respectively to each of the sharp pulses derived from unit 13 and each of these portions has an identical average value.

A frequency selector 15 is coupled to the output circuit of pulse shaper 14 and is effective to select only those components of the signal output of pulse shaper 14 which have a period less than a predetermined time, for example, less than two seconds. The frequency components present in the output circuit of unit 15, namely, the frequency components of the second signal provided by unit 15 which have a period less than a predetermined time which in the specific example chosen is a time of two seconds, are averaged over a relatively short time interval, for example $1/200$ of a second, by an integrator 16.

An adjustable-gain amplifier 17 is coupled to the output circuit of integrator 16 and the output circuit of amplifier 17 is supplied to an input circuit of a motor driven recorder 18 through a three-position switch 19. The switch 19 is so connected that the signal input to recorder 18 can be taken from a frequency selector 20, for one position of switch 19, can be taken directly for a second position of switch 19 as shown in the drawing, and can be taken through another frequency selector 21 for a third position of switch 19. The frequency selector 20 is effective to select all frequency components of the output signal of amplifier 17 within the frequency range of $1/2$ to 10 cycles. The frequency selector 21 is effective to select all frequency components of the output signal of the amplifier 17 within the frequency range of from 10 to 200 cycles.

A 60-cycle source 23 is provided for driving a motor associated with recorder 18. In order to provide an easily operated calibration arrangement for the apparatus of Fig. 1, a two-position switch 25 is provided between units 14 and 15. In one of its positions, the switch 25 connects the output circuit of pulse shaper 14 to the input circuit of frequency selector 15 while, in its other position, the switch 25 is effective to couple an output circuit of the source 23 to the input circuit of frequency selector 15. A voltmeter 26 is coupled across the input circuit of frequency selector 15.

In considering the operation of the apparatus of Fig. 1, reference is made to the curves of Fig. 2 which illustrates certain of the wave forms which are present in the system during operation. Thus for example, the output signal of oscillator 10 during an interval of time $t_1$ to $t_2$ may be as illustrated by the curve A. It will furthermore be assumed that device 11 is a magnetic recorder and reproducer. Thus, when the device 11 is connected to the oscillator 10, the output of oscillator 10 is recorded in the device 11. When the switch 12 is operated to connect the device 11 to the pulse former 13, it will be assumed that the recorded signal is reproduced in the device 11 and supplied to pulse former 13. Under these conditions, the reproduced signal should have the exact wave form of curve A of Fig. 2. However, as explained above, a reproduced signal does not usually have this exact wave form due to minute variations in speed of the mechanical drive system involved which may cause the reproduced signal to have a frequency which is either too high or too low during short intervals of time even though its average value is correct. Also, while not important in the case under consideration, the amplitude of the reproduced signal may have undesirable variations. Thus, the curve B of Fig. 2 illustrates what may be the wave form of the reproduced signal of the device 11 during a pre-determined short time interval $t_3$ to $t_4$ if, during this interval, the reproduced signal has a frequency which is too high. Conversely, the wave form of curve C may illustrate the wave form of the signal output of device 11 during an interval $t_5$ to $t_6$ when the frequency of the reproduced signal is too low.

The pulse former 13 is effective to derive sharp negative pulses having relative spacings depending upon the intercepts of the wave-signal input thereto. The sharp pulses which are thus developed by pulse former 13 during the intervals $t_1$–$t_2$, $t_3$–$t_4$, and $t_5$–$t_6$ are thus represented by the curves $A_1$, $B_1$ and $C_1$, respectively, of Fig. 2.

The means for deriving the above-mentioned second wave signal comprises the pulse shaper 14 which is responsive to each pulse of curves $A_1$, $B_1$, and $C_1$, for deriving a rectangular pulse of pre-determined duration. These pulses of rectangular wave form are illustrated by the curves $A_2$, $B_2$, and $C_2$, respectively.

The unit 15 is effective to select the frequency components above ½ cycle per second of the pulse signals $A_2$, $B_2$, and $C_2$, while the integrator 16 is effective to integrate the selected components over $\frac{1}{200}$ second intervals. The order of the operations performed by units 15 and 16 is unimportant and the curves of Fig. 2 illustrate the case where the integration of unit 16 is provided before frequency selector 15 is effective. Thus, the integration of the wave forms of curves $A_2$, $B_2$, and $C_2$, respectively, over a pre-determined time interval which may be $\frac{1}{200}$ second, provides a varying unidirectional output as illustrated by the curves $A_3$, $B_3$, and $C_3$, respectively. When, advantageously after further amplification, the very low-frequency components (including the direct-current component) are eliminated from the signal which includes portions represented by curves $A_3$, $B_3$, and $C_3$, the signal stabilizes itself about its alternating-current axis, thus providing an output signal which includes corresponding amplified portions as represented by curves $A_4$, $B_4$, and $C_4$.

The signal having portions represented by curves $A_4$, $B_4$, and $C_4$ is amplified in the adjustable-gain amplifier 17 and supplied to the recorder 18. The recorder 18 may be any motor-driven recorder of the paper-tape type and is thus effective, when the switch 19 is in the position shown, to plot a curve of the type illustrated in Fig. 2 and including the portions $A_4$, $B_4$, and $C_4$. The amplitude of this curve indicates the extent of frequency changes of the reproduced signal derived from the output circuit of the device under test 11. Since the speed of travel of the paper tape in the recorder is known, it follows that the rate of these frequency changes also is indicated.

In many mechanical-drive systems, the components of frequency changes having rates of change within the range of ½ to 10 cycles are of particular importance. As stated above, these are called "wow" components by sound engineers and the recorder 18 is effective to plot such frequency components when the switch 19 is operated to include frequency selector 20 in the input circuit of recorder 18. Conversely, under some conditions, frequency components in the frequency range of from 10 to 200 cycles are of particular importance to sound engineers, being called "flutter" frequencies. The system of Fig. 2 is effective to plot such frequency components when the switch 19 is operated to include frequency selector 21 in the input circuit of recorder 18.

In utilizing the system of Fig. 1, it is necessary to calibrate the apparatus in order that the amplitude of the signal recorded by recorder 18 will be known in terms of frequency deviation of the signal output of the device under test 11. A preferred calibration procedure will therefore be described. In order to effect the calibration, a signal output of known frequency from the device 11 is first applied through switch 12 to the input circuit of unit 13 and the average voltage present at the input circuit of frequency selector 15 is determined by reference to meter 26. This represents the voltage present at the input circuit of unit 15 for a signal of pre-determined frequency applied to the system. Since, in the normal operation of the instrument, the voltage at the input circuit of unit 15 varies linearly with frequency, it is known that a given change of the frequency of the input signal will produce a like average voltage change at the input circuit of unit 15. Also, since the portion of the instrument following circuit 14 is operated only by voltage changes, it is sufficient to adjust the response of recorder 18 to provide the desired deflection for any known voltage change at the input circuit of unit 15. The frequency of the calibrating signal for this portion of the instrument is not of importance so long as this frequency is within the range of frequency response of this portion of the instrument including the recorder 18. Accordingly, therefore, the switch 25 is operated so that the 60-cycle source 23 is connected directly to the input circuit of frequency selector 15 and the amplitude of the 60-cycle voltage so applied is adjusted to be equal to the above-mentioned known change in voltage. This 60-cycle signal is transmitted through the system and recorded by the recorder 18. The gain of amplifier 17 is then adjusted to provide the amplitude of recording on the recorder 18 desired. Under these conditions, the instrument is therefore calibrated so that frequency variations corresponding to a known percentage change of the signal output of the device under test 11, which in turn are effective to produce corresponding voltage variations of the signal input to unit 15, also produce this desired deflection on the recorder 18. Also, since the characteristic of the unit is a linear one, greater or smaller variations in the frequency of the signal output of the device under test 11 produce correspondingly greater or smaller amplitudes of recording by the recorder 18.

The units of Fig. 1, with the exception of pulse former 13, pulse shaper 14, and frequency selector 15 are well understood by those skilled in the art, rendering a detailed description unnecessary. Specific circuits which have been found to have particular utility in units 13, 14, and 15 will be described hereinafter. Thus, in Fig. 3 there is illustrated a circuit which may be utilized as the pulse former 13. This circuit comprises a transformer 30 connected in the circuit of a full-wave rectifier, including a double-diode vacuum tube 31 and an output resistor 32. The input circuit of a pentode vacuum tube 33 is coupled across the resistor 32. The output circuit of tube 33 includes a load resistor 34 and a coupling network, including a series condenser 35 and a shunt resistor 36 across which the output voltage of the unit is derived. A shunt condenser 37 and a shunt resistor 38 are included in the screen circuit of tube 33 and a suitable operating voltage is supplied to the screen grid of the tube through a resistor 39 from the source of unidirectional operating voltage for the tube, indicated as +B. In considering the operation of the circuit of Fig. 3, it will be seen that the tube 31 acts as a full-wave rectifier to provide half sine waves of negative polarity across resistor 32. The voltage supplied to the grid of tube 33 thus has a high negative value so that, throughout most of the cycle, the input electrode thereof has a negative potential applied thereto which is sufficient to maintain the tube non-conductive. However, when the input signal to tube 33 approaches the value of zero potential, as it does on the intercepts of alternating potential applied to the input circuit of transformer 30, the tube 33 becomes conductive to produce sharp negative pulses in the output circuit, these sharp negative pulses being as illustrated in curves $A_1$, $B_1$, and $C_1$ of Fig. 2.

Figure 4:
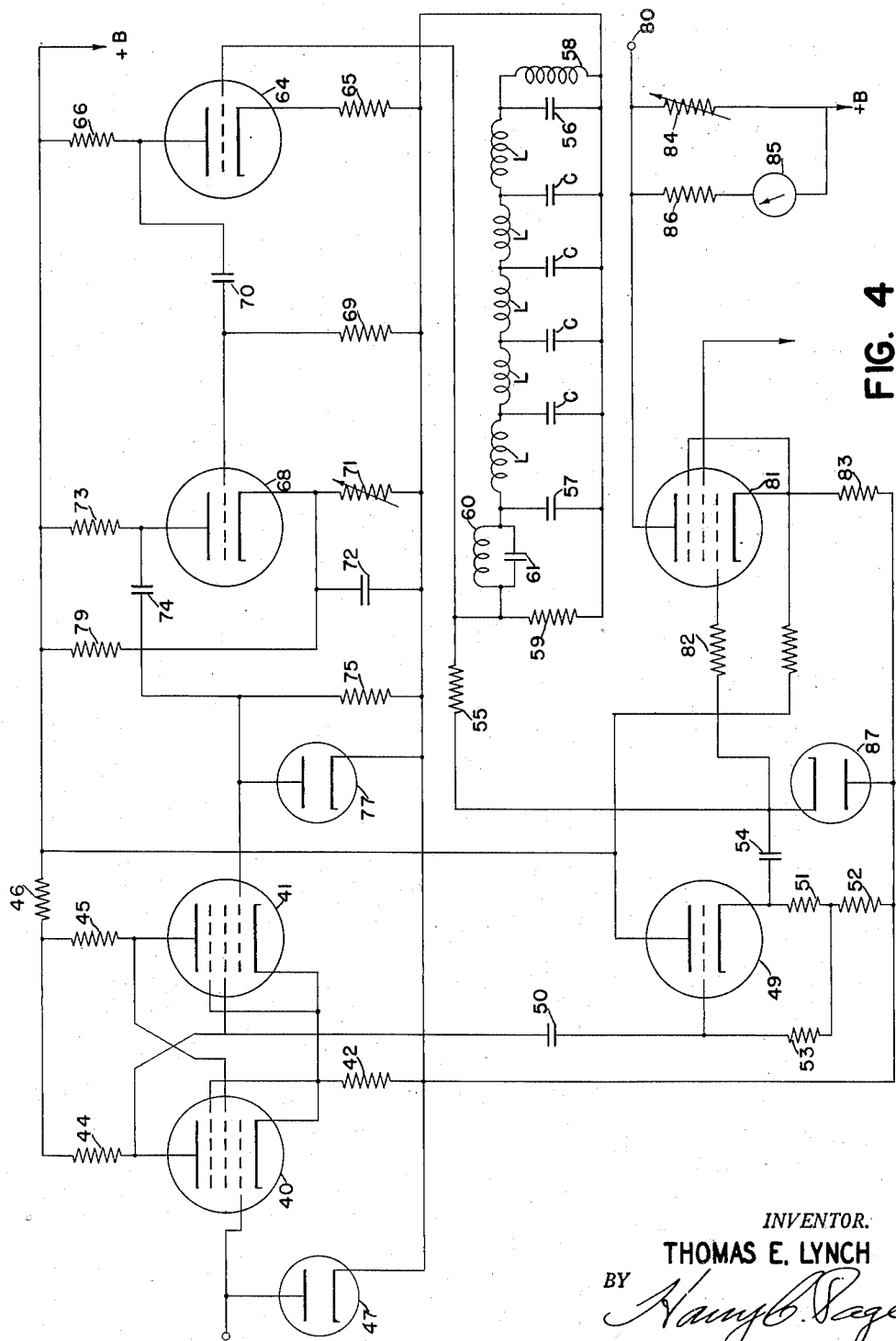

The pulse shaper 14 may be provided by a circuit arrangement in accordance with that illustrated in Fig. 4. In order to derive the pulses of curves $A_2$, $B_2$, and $C_2$ of Fig. 2, a trigger circuit is utilized which includes pentode tubes 40 and 41 having a common cathode resistor 42 and having cross connections between the anode of each tube and a control electrode of the other tube to provide a well-known trigger action. Separate load resistors 44 and 45 are provided, respectively, for the tubes 40 and 41, a common load resistor 46 also being provided. A stabilizing diode 47 is connected between a signal-input electrode of tube 40 and ground in order to stabilize the bases of the sharp pulses from unit 13 of Fig. 1 at the zero potential level. An output signal is derived from the trigger circuit by means of a connection to the anode of tube 40, this signal being applied to the input circuit of a triode 49, through a coupling condenser 50. Series-connected resistors 51 and 52 are provided in the cathode circuit of tube 49 and a resistor 53 is connected between the control electrode of tube 49 and the common junction of resistors 51 and 52. A signal output is derived from the series-connected resistors 51 and 52 and applied, through a condenser 54 and resistor 55, to the input circuit of a short-circuited delay line. This delay line includes series inductance elements L and shunt capacitance elements C. A terminating inductor 58 is connected across the last shunt condenser 56 of the delay line and a matching impedance termination is provided at the input terminals of the delay line. This termination comprises a shunt resistor 59 and a combination of an inductor 60 and a condenser 61. The first shunt condenser of the delay line is designated by the reference numeral 57.

The signal present at the input terminal of the delay line is also amplified in a triode vacuum tube 64, the tube 64 having a cathode resistor 65 and an anode resistor 66. An output signal is coupled from the anode circuit of tube 64 to the input circuit of a limiter tube 68 through a coupling network including a shunt resistor 69 and a series condenser 70. A parallel-connected resistor 71 and condenser 72 are included in the cathode circuit of tube 68. Tube 68 is also provided with a load resistor 73 and an output potential is derived from the anode circuit of this tube and applied to a control grid of tube 41, through a coupling network including a series condenser 74 and a shunt resistor 75. A stabilizing diode 77 is provided between the input electrode of tube 41 and ground. The cathode of tube 68 is connected to the unidirectional source of supply for the system, indicated +B, through a resistor 79.

The output signal of the arrangement of Fig. 4 is derived at a terminal 80 through a vacuum tube 81 having an input circuit connected through a resistor 82 to the common terminal of condenser 54 and resistor 55. A cathode resistor 83 is provided for tube 81 and a load resistor 84 is provided for the tube. A meter 85 is connected across the load resistor 84 through a resistor 86. A stabilizing diode 87 is provided between the common junction of condenser 54 and resistor 82 and ground.

In considering the operation of the circuit of Fig. 4 it will be seen that the tubes 40 and 41 are cross-connected to provide a well-known type of trigger circuit. The circuit elements are so chosen that tube 40 is normally conductive in the absence of a negative pulse output from the sharp pulse former 13. The diode 47 is effective to stabilize the bases of the sharp pulses of curves $A_1$, $B_1$, and $C_1$ at the zero potential level. The arrival of one of the sharp pulses, therefore, is effective to cause tube 41 to become conductive. The pulse, which is present across load resistor 44 under these conditions, is translated by tube 49 and applied, through the coupling condenser 54 and resistor 55 to the input circuit of the delay line. This pulse travels down the delay line, is reflected and reversed in polarity, and returns to the input terminal of the delay line after a pre-determined time interval which depends upon the relay inherent in the circuit. It is this delay which is the main factor in controlling the duration of the pulses which are generated in the output circuit of the arrangement of Fig. 4. The round-trip time of the delay line is preferably about 200 micro-seconds. The tube 87 is effective to stabilize the bases of the generated pulses at the zero-potential level.

The entire signal present at the input circuit of the delay line is also applied to the input circuit of tube 64. The signal input to tube 64 is amplified in the tube and differentiated in the coupling circuit, including condenser 70 and resistor 69, so that the reflected pulse derived from the delay line is effective to provide a positive sharp pulse in the input circuit of tube 68. This positive pulse is amplified and reversed in polarity by tube 68 and is thereafter applied, through the coupling condenser 74, to the first control electrode of the tube 41. The negative pulse thus applied to the control electrode of the tube 41 has the effect of operating the tube to cut off and, due to the cross-connection between the tubes 40 and 41, the tube 40 is thereby caused to be returned to its original, or conductive, state. The diode 77 is utilized to stabilize the signal input to tube 41 at the tips of the pulses. Thus a further step voltage is applied to the input circuit of tube 49 when the tube 49 again becomes conductive. The input to tube 81, therefore, includes the original step voltage of positive polarity, due to tube 40 becoming non-conductive by the original application of a sharp pulse thereto from the pulse former 13, and also includes the step of negative polarity due to the return of tube 40 to its normal or conductive condition in the manner described above. These two step voltages, with polarity reversal in the circuit of tube 81, constitute the output signal of the system which is derived at terminal 80. This output signal includes one pulse for each of the sharp pulses derived from pulse former 13 of Fig. 1, these pulses being of a precise duration determined primarily by the delay line of Fig. 4, the pulses being as illustrated by the curves $A_2$, $B_2$, and $C_2$ of Fig. 2.

Figure 5:
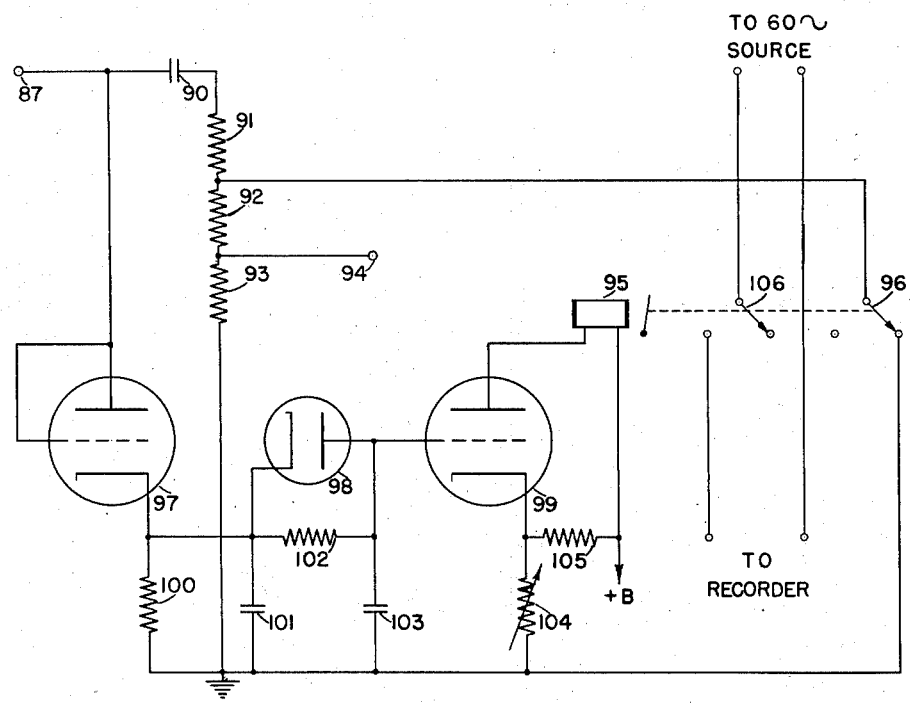

The frequency selector 15 is illustrated in Fig. 5. Essentially, this comprises a network including a condenser 90 in series with which are connected resistors 91, 92, and 93. The input terminal for this unit is indicated by the reference numeral 87 and the output terminal is indicated by the reference numeral 94.

Inasmuch as there is a sharp transient in the system of Fig. 1 when the apparatus is first placed in operation, it is desirable to provide some arrangement for preventing this transient from being applied through the system. Therefore, a relay 95 is preferably provided having normally closed contacts 96 which are effective to short-circuit the resistors 92 and 93. This short-circuit is removed from the system when the relay 95 is energized and, in order to provide an automatic operation, the relay 95 is energized by the signal input to terminals 87 through vacuum tubes 97, 98, and 99. The purpose of this circuit is to cause relay 95 to be energized after about one second delay, when a signal input is present at terminal 87, and to be de-energized immediately when the signal input to terminal 87 is interrupted. Tube 98 is a diode having its anode connected to the grid of the tube 99 and its cathode connected to the cathode of tube 97. The parallel combination of a resistor 100 and condenser 101 is included in the cathode circuit of tube 97, the anode and control electrode of tube 97 being connected together so that the tube operates as a diode. A resistor 102 is connected across the diode 98 and the anode of tube 98 is coupled to ground through a condenser 103. A cathode resistor 104 is provided for tube 99, its cathode being coupled to the source of operating potential for the system, indicated +B, through a resistor 105.

In considering the operation of the circuit of Fig. 5, it will be seen that, when relay 95 is deenergized, the time constant of the frequency selector, including the condenser 90 and its series resistance, is small due to the fact that resistors 92 and 93 are short-circuited. This small time constant allows the condenser 90 to charge quickly and the effective short circuit on terminal 94 prevents transients from being coupled to the integrator 16 of Fig. 1. After a short time, however, the relay 95 is energized to provide the normal operation which is described above. Preferably, also, the relay 95 includes a normally open set of contacts 106 which are included in the circuit connecting the motor drive of the recorder 18 to the 60-cycle power source 23 of Fig. 1. This assures that the motor of the recorder is not driven except during those intervals when a signal is to be recorded.

While the applicant does not wish to be limited to any particular circuit values, there follows a list of certain values which have been found to be particularly effective in the circuits of Figs. 4 and 5.

Tubes 40 and 41—type 6SJ7
Tubes 47, 77, 87, 98—type 6AL5
Resistor 42—680 ohms
Resistors 44 and 45—33 kilohms
Resistor 69—1 megohm
Resistor 91—470 kilohms
Resistor 92—470 kilohms
Resistor 93—9 megohms
Inductors L—33 millihenrys with approximately 7½ millihenrys between adjacent coils
Inductor 58—8 millihenrys
Condenser C—0.004 microfarad
Condenser 56—0.005 microfarad
Condenser 57—0.003 microfarad
Condenser 70—25 micro-microfarads
Condenser 90—0.1 microfarad
Source of uni-directional operating potential for the tubes (+B)—300 volts While there have been described what are at present considered to be the preferred embodiments of this invention, it will be obvious to those skilled in the art that various changes and modifications may be made therein without departing from the invention, and it is, therefore, aimed in the appended claims to cover all such changes and modifications as fall within the true spirit and scope of the invention.

I claim as my invention:

1. An apparatus for providing an indication of frequency changes of a first wave signal comprising: means for deriving sharp electrical pulses having relative spacings dependent upon the intercepts of said wave signal; means dependent upon said sharp pulses for deriving a second wave signal having only separate portions corresponding respectively to each of said sharp pulses and having identical average values in each of said portions; means for deriving a third signal varying in accordance with the average value, over a relatively short time interval, of the frequency components of said second wave signal having a period less than a predetermined time substantially greater than said short interval; and means for utilizing said third signal to provide indications of changes of frequency of said first wave signal.

2. An apparatus for providing an indication of frequency changes of a first wave signal comprising: means for deriving sharp electrical pulses having relative spacings dependent upon the intercepts of said wave signal; means dependent upon each of said sharp pulses for deriving a rectangular pulse of predetermined duration to provide a second wave signal; means for deriving a third signal varying in accordance with the average value, over a relatively short time interval, of the frequency components of said second wave signal having a period substantially less than a predetermined time substantially greater than said short interval; and means for utilizing said third signal to provide indications of changes of frequencies of said first wave signal.

3. An apparatus for providing an indication of frequency changes of a first wave signal comprising: means for deriving sharp electrical pulses having relative spacings dependent upon the intercepts of said wave signal; means dependent upon said sharp pulses for deriving a second wave signal having only separate portions corresponding respectively to each of said sharp pulses and having identical average values in each of said portions; means for deriving the frequency components of said second wave signal which have a period less than a predetermined time; means for integrating said frequency components over an interval of time which is short with respect to said predetermined time to provide a third wave signal; and means for utilizing said third signal to provide indications of changes of frequency of said first wave signal.

4. An apparatus for providing an indication of frequency changes of a first wave signal comprising: means for deriving sharp electrical pulses having relative spacings dependent upon the intercepts of said wave signal; means dependent upon said sharp pulses for deriving a second wave signal having only separate portions corresponding respectively to each of said sharp pulses and having an identical average value in each of said portions; a resistor condenser network for deriving the frequency components of said second wave signal which have a period less than a predetermined time; means for integrating said frequency components over an interval of time which is short with respect to said predetermined time to provide a third wave signal; and means for utilizing said third signal to provide indications of changes of frequency of said first wave signal.

5. An apparatus for providing an indication of frequency changes of a first wave signal comprising: means for deriving sharp electrical pulses having relative spacings dependent upon the intercepts of said wave signal; means dependent upon said sharp pulses for deriving a second wave signal having only separate portions corresponding respectively to each of said sharp pulses and having identical average values in each of said portions; means for deriving a third signal varying in accordance with the average value, over a relatively short time interval, of the frequency components of said second wave signal having a period less than a predetermined time substantially greater than said short interval; an adjustable amplifier for amplifying said third signal; and means for utilizing said amplified third signal to provide indications of changes of frequency of said first wave signal.

6. An apparatus for providing an indication of frequency changes of a first wave signal comprising: means for deriving sharp electrical pulses having relative spacings dependent upon the intercepts of said wave signal; means dependent upon said sharp pulses for deriving a second wave signal having only separate portions corresponding respectively to each of said sharp pulses and having identical average values in each of said portions; means for deriving a third signal varying in accordance with the average value, over a relatively short time interval, of the frequency components of said second wave signal having a period less than a predetermined time substantially greater than said short interval; means including an adjustable-gain amplifier for utilizing said third signal to provide indications of changes of frequency of said first wave signal; a calibrating alternating-potential source having a period between said above-mentioned time intervals; means for measuring the average value of said second wave signal for a predetermined frequency of said first wave signal; means for applying a potential from said source, which is equal to a predetermined portion of said last-named average value, to said means for deriving said third signal; and means for adjusting the gain of said amplifier to provide a predetermined indication in response to said applied potential, thereby to calibrate said indications for all changes of frequency of said first wave signal.

7. An apparatus for providing an indication of frequency changes of a first wave signal comprising: means for deriving sharp electrical pulses having relative spacings dependent upon the intercepts of said wave signal; means dependent upon said sharp pulses for deriving a second wave signal having only separate portions corresponding respectively to each of said sharp pulses and having identical average values in each of said portions; means for deriving a third signal varying in accordance with the average value, over a relatively short time interval, of the frequency components of said second wave signal having a period less than a predetermined time substantially greater than said short interval; a recorder; and means for utilizing said third signal to actuate said recorder to provide a record of changes of frequency of said first wave signal.

8. An apparatus for providing an indication of frequency changes of a first wave signal comprising: means for deriving sharp electrical pulses having relative spacings dependent upon the intercepts of said wave signal; means dependent upon said sharp pulses for deriving a second wave signal having only separate portions corresponding respectively to each of said sharp pulses and having identical average values in each of said portions; means for deriving a third signal varying in accordance with the average value, over a relatively short time interval, of the frequency components of said second wave signal having a period less than a predetermined time substantially greater than said short interval; means for selecting predetermined frequency components of said third signal and for utilizing the selected components to provide indications of changes of frequency of said first wave signal.

THOMAS E. LYNCH.

REFERENCES CITED

The following references are of record in the file of this patent:

UNITED STATES PATENTS

| Number | Name | Date |
|---|---|---|
| 2,188,970 | Wilson | Feb. 6, 1940 |
| 2,212,967 | White | Aug. 27, 1940 |
| 2,260,933 | Cooper | Oct. 28, 1941 |
| 2,265,996 | Blumlein | Dec. 16, 1941 |
| 2,352,082 | De Rosa | June 20, 1944 |
| 2,366,076 | Wilbur | Dec. 26, 1944 |